United States Patent
Sheinfeld

(10) Patent No.: US 10,387,474 B2
(45) Date of Patent: Aug. 20, 2019

(54) SYSTEM AND METHOD FOR CROSS-CLOUD IDENTIFICATION OF TOPICS

(71) Applicant: HARMON.IE R&D LTD., Lod (IL)

(72) Inventor: Roy Sheinfeld, Tel Aviv (IL)

(73) Assignee: HARMON.IE R&D LTD., Lod (IL)

( * ) Notice: Subject to any disclaimer, the term of this patent is extended or adjusted under 35 U.S.C. 154(b) by 303 days.

(21) Appl. No.: 15/286,953

(22) Filed: Oct. 6, 2016

(65) Prior Publication Data

US 2017/0103077 A1    Apr. 13, 2017

Related U.S. Application Data

(60) Provisional application No. 62/238,149, filed on Oct. 7, 2015.

(51) Int. Cl.
*G06F 16/35* (2019.01)

(52) U.S. Cl.
CPC .................. *G06F 16/355* (2019.01)

(58) Field of Classification Search
CPC ............. G06F 17/3071; G06F 17/30707
See application file for complete search history.

(56) References Cited

U.S. PATENT DOCUMENTS

| | | | |
|---|---|---|---|
| 7,376,594 B2 | 5/2008 | Nigrin | |
| 7,461,061 B2 | 12/2008 | Aravamudan et al. | |
| 7,529,741 B2 | 5/2009 | Aravamudan et al. | |
| 7,565,383 B2 | 7/2009 | Gebhart et al. | |
| 7,599,925 B2 | 10/2009 | Larson et al. | |
| 7,636,900 B2 | 12/2009 | Xia | |
| 7,792,815 B2 | 9/2010 | Aravamudan et al. | |
| 7,797,298 B2 | 9/2010 | Sareen et al. | |
| 7,945,600 B1* | 5/2011 | Thomas | G06F 17/30707 707/804 |
| 7,958,141 B2 | 6/2011 | Sundaresan et al. | |
| 8,032,666 B2 | 10/2011 | Srinivansan et al. | |
| 8,073,860 B2 | 12/2011 | Venkataraman et al. | |
| 8,086,604 B2 | 12/2011 | Arrouye et al. | |
| 2004/0186989 A1 | 9/2004 | Clapper | |
| 2005/0004891 A1* | 1/2005 | Mahoney | G06F 17/30707 |
| 2006/0206803 A1 | 9/2006 | Smith | |
| 2007/0112739 A1 | 5/2007 | Burns et al. | |
| 2010/0094854 A1 | 4/2010 | Rouhani-Kalleh | |
| 2011/0131205 A1 | 6/2011 | Iyer et al. | |
| 2011/0161168 A1* | 6/2011 | Dubnicki | G06F 17/30707 705/14.49 |
| 2013/0297999 A1* | 11/2013 | Shami | G06F 17/30719 715/205 |

* cited by examiner

*Primary Examiner* — William Spieler
(74) *Attorney, Agent, or Firm* — M&B IP Analysts, LLC

(57) ABSTRACT

A system and method for identifying topics in unstructured data. The method includes obtaining unstructured data from at least one data source, wherein the obtained unstructured data includes at least one unstructured data object; determining, based on the obtained unstructured data, at least one set of topic identification rules; identifying, based on the at least one unstructured data object and the at least one set of topic identification rules, at least one candidate topic of the unstructured data; and analyzing the unstructured data with respect to the at least one candidate topic to determine at least one representative topic from among the at least one candidate topic, wherein each of the at least one representative topic indicates a context of at least a portion of the unstructured data.

20 Claims, 3 Drawing Sheets

SYSTEM AND METHOD FOR CROSS-CLOUD IDENTIFICATION OF TOPICS

CROSS-REFERENCE TO RELATED APPLICATIONS

This application claims the benefit of U.S. Provisional Application No. 62/238,149 filed on Oct. 7, 2015, the contents of which are hereby incorporated by reference.

TECHNICAL FIELD

The present disclosure relates generally to analyzing contextual data, and more particularly to identifying unstructured topics of contextual data.

BACKGROUND

Though activity streams arise from social networking platforms, nowadays they have also become common in enterprise social networks. The implementation of an activity stream in an enterprise social network allows online interaction among the enterprise's employees. Furthermore, such implementation provides a cross-enterprise communication platform that enables a constant update of the enterprise's latest news.

In large enterprises, employees are typically required to interface with several activity streams where each activity stream usually displays information received from a different source. Such activity streams are commonly swamped with content that is often irrelevant to a user. As a result, enterprise social networks are inefficient tools for most employees trying to extract relevant information therefrom.

A significant problem faced by employees of such enterprises is making sense of the sheer volume of information being delivered on a regular basis. The adoption of multiple cloud services by many enterprises further exacerbates this problem by introducing more information that is largely disconnected from the other information. This additional information increases pressure on workers and may result in information overload, i.e., an inability to effectively evaluate incoming information. These problems may further result in overlooking important information, thereby causing potentially costly mistakes.

Some calendar applications provide additional information regarding calendar events for the purpose of easing identification of important or otherwise relevant events. Such information may come in, e.g., the form of free-text fields in which an event planner can describe, for example, the purpose of the event. Text in these free-text fields typically relates to information stored in other applications such as, e.g., customer relation management systems, sales force automation applications, and document management systems. However, extraction of textual information from calendar events and relating the information to structured data in different applications is a complex process that often must be performed manually. As a result, enterprise employees do not typically have access to classified or otherwise easily searchable content across cloud resources.

It would therefore be advantageous to provide a solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a method for identifying topics in unstructured data. The method includes obtaining unstructured data from at least one data source, wherein the obtained unstructured data includes at least one unstructured data object; determining, based on the obtained unstructured data, at least one set of topic identification rules; identifying, based on the at least one unstructured data object and the at least one set of topic identification rules, at least one candidate topic of the unstructured data; and analyzing the unstructured data with respect to the at least one candidate topic to determine at least one representative topic from among the at least one candidate topic, wherein each of the at least one representative topic indicates a context of at least a portion of the unstructured data.

Certain embodiments disclosed herein also include a non-transitory computer readable medium having stored thereon instructions for causing one or more processing units to execute a method, the method comprising: obtaining unstructured data from at least one data source, wherein the obtained unstructured data includes at least one unstructured data object; determining, based on the obtained unstructured data, at least one set of topic identification rules; identifying, based on the unstructured data and the at least one set of topic identification rules, at least one candidate topic of the unstructured data; and analyzing the unstructured data with respect to the at least one candidate topic to determine at least one representative topic from among the at least one candidate topic, wherein each of the at least one representative topic indicates a context of at least a portion of the unstructured data.

Certain embodiments disclosed herein also include a system for identifying topics in unstructured data, comprising: a processing circuitry; and a memory, the memory containing instructions that, when executed by the processing circuitry, configure the system to: obtain unstructured data from at least one data source, wherein the obtained unstructured data includes at least one unstructured data object; determine, based on the obtained unstructured data, at least one set of topic identification rules; identify, based on the at least one unstructured data object and the at least one set of topic identification rules, at least one candidate topic of the unstructured data; and analyze the unstructured data with respect to the at least one candidate topic to determine at least one representative topic from among the at least one candidate topic, wherein each of the at least one representative topic indicates a context of at least a portion of the unstructured data.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
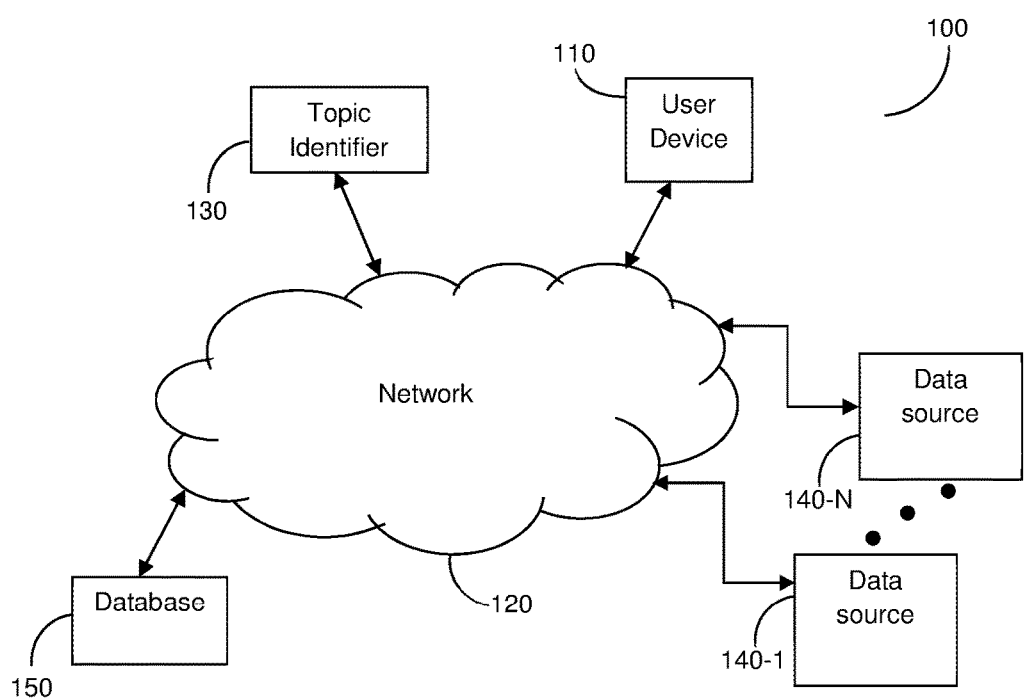
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for cross-cloud identification of topics based on unstructured data. Unstructured data such as textual content is obtained from data sources accessible to a cloud-based system. For each data source, a type of the data source is determined. Based on the determined types, a set of rules for each data source used for identifying topics in the unstructured data is determined. Candidate topics are determined based on the unstructured data. The topics of the unstructured data are identified from among the candidate topics based on the determined sets of rules.

FIG. 1 shows an example network diagram 100 utilized to describe the various disclosed embodiments. The network diagram 100 includes a network 120 communicatively connected to a user device 110, a topic identifier 130, a plurality of data sources 140-1 through 140-N (hereinafter referred to individually as a data source 140 and collectively as data sources 140, merely for simplicity purposes), and a database 150. The network 120 may be, but is not limited to, a wireless, cellular or wired network, a local area network (LAN), a wide area network (WAN), a metro area network (MAN), the Internet, the worldwide web (WWW), similar networks, and any combination thereof.

The user device 110 may be, but is not limited to, a personal computer, a laptop, a tablet computer, a smartphone, a wearable computing device, or any other device capable of receiving and viewing unstructured data accessible via the data sources 140. As a non-limiting example, the user device 110 may be a smart phone or a desktop computer. The user device 110 may be utilized by, for example, an employee of an organization having data stored in the data sources 140. The data sources 140 may include, but are not limited to, social networks, enterprise networks, chat applications, and other sources of data with which the user device 110 communicates. In particular, the data sources 140 may be data sources accessible via cloud-based networking. The data sources 140 may store data in different formats and, further, may each store unstructured or semi-structured data.

In an embodiment, the topic identifier 130 is configured to obtain unstructured data from the data sources 140. The unstructured data does not have a predefined data model or is otherwise not organized in a predetermined manner. The unstructured data may include unstructured data objects such as, but is not limited to, documents, messages (e.g., an email message), chat correspondence, SMS messages, images, video clips, calendar event descriptions, other textual content, and combinations thereof. In a further embodiment, the topic identifier 130 may be configured to monitor the data sources 140 to identify unstructured data in real-time as it is stored in the data sources 140.

The topic identifier 130 is configured to analyze the obtained unstructured data to determine a type of each unstructured data object. In an embodiment, the analysis may be a statistical analysis or a semantic analysis. Example types of unstructured data objects may include, but are not limited to, messages, documents, multimedia content, free-text, and the like. In a further embodiment, analyzing the unstructured data may include parsing each unstructured data object into a plurality of portions and identifying each portion.

Based on the identified portions, a type of the unstructured data object may be determined. As a non-limiting example, an unstructured data object may be parsed to identify portions such as a header, a body, and one or more attachments. Based on the parsed portions, it is determined that the unstructured data object is a message (in particular, an email message).

In an embodiment, based on the determined type of each unstructured data object, the topic identifier 130 is configured to retrieve at least one set of topic identification rules for identifying topics within the unstructured data. Each topic is a textual term representing a context of one of the unstructured data objects. As a non-limiting example, a topic for an email related to a meeting with the President of the company may be "Meeting with Company President." The topic identification rules may indicate portions of particular types of content that are likely or unlikely to be related to topics and may include, but are not limited to, ignoring particular sections of unstructured data objects (e.g., the first line in an email message), identifying key words (e.g., proper nouns, dates, "buzz" words that are typically associated with important information, etc.), ignoring unimportant words (e.g., transitional words or words that are otherwise typically utilized for sentence structure rather than to provide contextual information) prioritizing particular portions of an unstructured data object (e.g., the header in an email message), combinations thereof, and the like.

Based on the topic identification rules, the topic identifier 130 is configured to identify at least one candidate topic of the unstructured data. In a further embodiment, the topic identifier 130 is configured to select a representative topic from among the at least one candidate topic. The selection may include, but is not limited to, a statistical analysis or a semantic analysis of the candidate topics with respect to the unstructured data. To this end, selecting the representative topic may be based on, but not limited to, matching among portions of each unstructured data object, matching between unstructured data objects, matching between portions of unstructured data objects and metadata, combinations thereof, and the like. The representative topic is the candidate topic which is most descriptive of a context of the unstructured data. The topic identifier 130 may be further configured to store the selected representative topic in, e.g., the database 150.

The representative topic may be utilized for, for example, classifying, storing, clustering, providing analytics, or a combination thereof, for the unstructured data or any of the unstructured data objects of the unstructured data. Specifically, in an example embodiment, the topic identifier 130 may be configured to match a query to representative topics associated with unstructured data objects to identify unstructured data objects that are related to the query. As a non-limiting example, the topic identifier 130 receives a query from the user device 110. The topic identifier 130 matches the query to at least one representative topic stored in the database 150. Based on the matching, the topic identifier 130 identifies one or more matching unstructured data objects. The topic identifier 130 returns the identified matching unstructured data objects to the user device 110.

Figure 2:
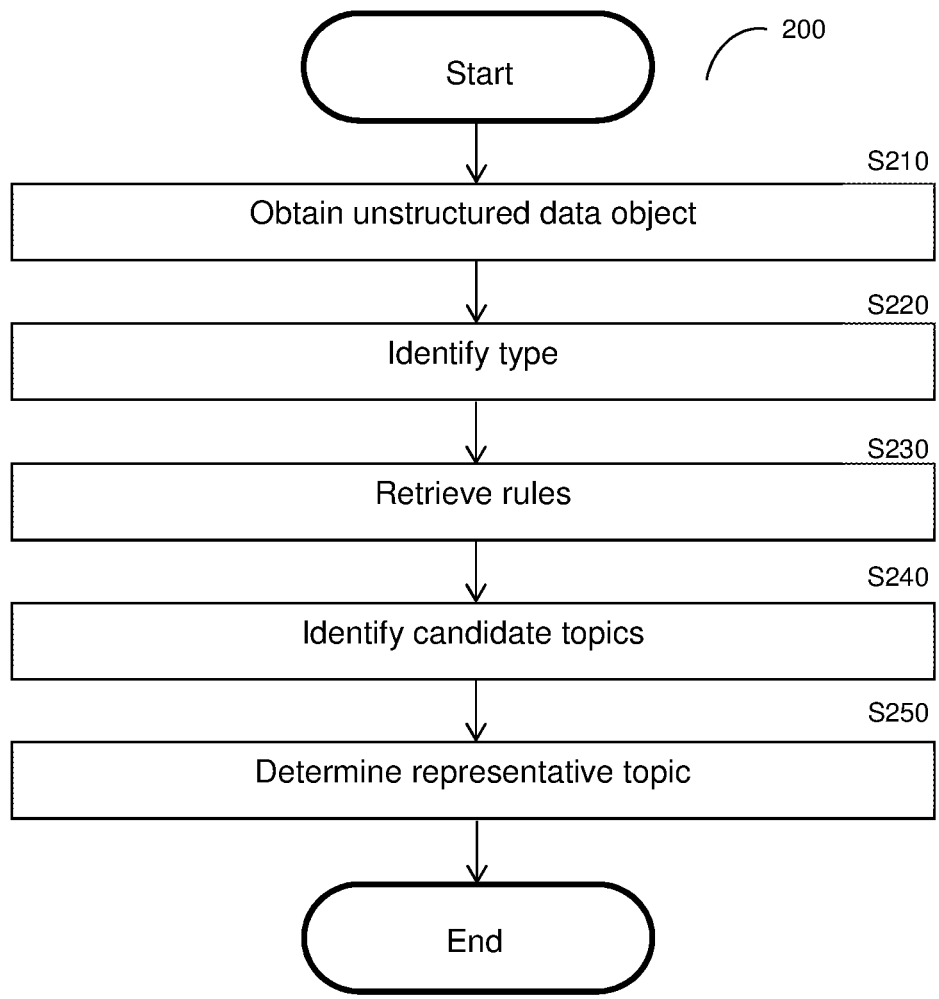
FIG. 2 is a flowchart illustrating a method for cross-cloud topic identification according to an embodiment.

FIG. 2 is an example flowchart 200 illustrating a method for cross-cloud topic identification according to an embodiment. In an embodiment, the method may be performed by a topic identifier (e.g., the topic identifier 130). In some embodiments, the method may be performed upon, e.g., receiving a query for unstructured data objects related to a context of the query. In other embodiments, the method may be performed, in real-time, as unstructured data is obtained.

At S210, at least one unstructured data object is obtained. The at least one unstructured data object may be obtained from at least one data source (e.g., one or more of the data sources 140). In an embodiment, S210 further includes monitoring the data sources to identify unstructured data objects being stored therein. Monitoring the unstructured data sources allows for identifying new topics in real-time as new data is received by the data sources. In another embodiment, S210 may further include obtaining metadata associated with each unstructured data object. The metadata may also be obtained from, e.g., the data sources.

At S220, a type of each unstructured data object is determined. In an embodiment, S220 may include analyzing each unstructured data object, analyzing the metadata associated with each unstructured data object, or both. In a further embodiment, the analysis may further include partitioning each unstructured data object into portions and identifying a type of each portion (e.g., header, message content, calendar date and time, attachments, etc.). The type of each unstructured data object may be determined further based on the identified portions.

At S230, based on the determined types, at least one set of topic identification rules is obtained. The topic identification rules may be, for example, retrieved from a database (e.g., the database 150). Each set of topic identification rules corresponds to a type of unstructured data object. As a non-limiting example, a first set of topic identification rules may correspond to email messages, while a second set of topic identification rules may correspond to electronic documents.

The topic identification rules may indicate portions of particular types of content that are likely or unlikely to be related to topics and may include, but are not limited to, ignoring particular sections of unstructured data objects (e.g., the first line in an email message), identifying key words (e.g., proper nouns, dates, "buzz" words that are typically associated with important information, etc.), ignoring predetermined unimportant words (e.g., words predetermined to be irrelevant to context), prioritizing particular portions of an unstructured data object (e.g., the header in an email message), combinations thereof, and the like.

At S240, at least one candidate topic is identified based on the unstructured data and the sets of topic identification rules. In an embodiment, identifying the candidate topics is further based on matching among portions of an unstructured data objects, between portions of different unstructured data objects, or both. In a further embodiment, the identification of the candidate topics may be further based on the obtained metadata.

At S250, at least one representative topic is determined from among the identified candidate topics. The determined representative topics are topics that are most descriptive of the obtained unstructured data or of particular unstructured data objects in the unstructured data. In an embodiment, S250 may include performing a statistical analysis or a semantic analysis of the candidate topics with respect to the unstructured data. In a further embodiment, S250 may also include matching or otherwise correlating among the unstructured data to identify candidate topics that appear most frequently.

As a non-limiting example, unstructured data including an unstructured data object featuring an email is obtained from a server storing email messages used by email applications. A type of the unstructured data object is determined to be an email message. A set of topic identification rules for email messages is obtained. The topic identification rules include identifying the textual content in the header of the email. The topic identification rules also include, for email messages including multiple paragraphs in a body of the email message, not analyzing the first and last paragraph, as each such paragraph typically contains information that is irrelevant to a topic of the email (e.g., an introductory message such as "Dear Bob" for the first paragraph and a signature of the sender for the last paragraph).

Analysis of the header results in determination that the header mentions a "System Update on Tuesday." Analysis of portions of the body other than the first and last paragraph results in determining the textual content "important computer system update." The results of the analyses of the header and the body are matched to determine a representative topic of "system update." The "system update" topic may be stored in a database and associated with the email message. Thus, when a user subsequently queries for data related to the "system update," the email message may be included in the results of the query.

Figure 3:
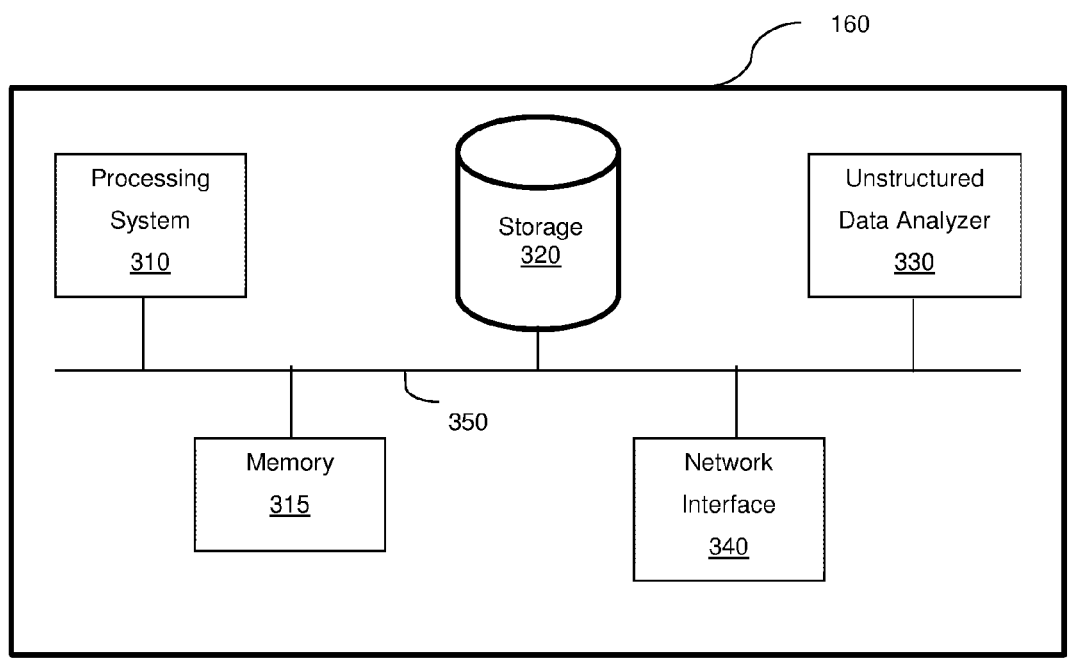
FIG. 3 is a block diagram of a topic identifier according to an embodiment.

FIG. 3 is an example block diagram of the topic identifier 130 according to an embodiment. The topic identifier 130 includes a processing system 310 coupled to a memory 315, a storage 320, an unstructured data analyzer 330, and a network interface 340. In an embodiment, the components of the topic identifier 130 may be communicatively connected via a bus 350.

The processing system 310 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 315 may be volatile (e.g., RAM, etc.), non-volatile (e.g., ROM, flash memory, etc.), or a combination thereof. In one configuration, computer readable instructions to implement one or more embodiments disclosed herein may be stored in the storage 320.

In another embodiment, the memory 315 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 410 to perform the various processes described herein. Specifically, the instructions, when executed, cause the processing system 410 to perform topic identification in unstructured data, as discussed hereinabove.

The storage 320 may be magnetic storage, optical storage, and the like, and may be realized, for example, as flash memory or other memory technology, CD-ROM, Digital Versatile Disks (DVDs), or any other medium which can be used to store the desired information. In an embodiment, the storage 320 may store information such as, but not limited to, topic identification rules for different types of unstructured data objects.

The unstructured data analyzer 330 is configured at least to parse unstructured data objects into portions and to analyze the parsed portions to identify candidate topics. The portion analysis may be further include determining a type of each unstructured data object based on the parsed portions and applying, based on the determined types of the unstructured data objects, at least one topic identification rule to identify candidate topics.

In a further embodiment, the unstructured data analyzer 330 is configured to determine at least one representative topic from among the identified candidate topics. The determination of the at least one representative topic may further include a statistical analysis or a semantic analysis of the candidate topics with respect to the unstructured data. To this end, the determination of the at least one representative topic may include matching or correlating among the unstructured data to determine the most descriptive topic based on, e.g., topic frequency relative to a particular unstructured data object or group of unstructured data objects, or relative to the unstructured data generally.

The network interface 340 allows the topic identifier 130 to communicate with the data sources 140 for the purpose of, for example, obtaining unstructured data, retrieving topic identification rules, combinations thereof, and the like.

It should be understood that the embodiments described herein are not limited to the specific architecture illustrated in FIG. 3, and other architectures may be equally used without departing from the scope of the disclosed embodiments.

It should be noted that the embodiments described herein are discussed with respect to identifying topics in unstructured data merely for simplicity purposes and without limitation on the disclosed embodiments. Other data such as semi-structured or structured data may be analyzed to identify topics in addition to unstructured data without departing from the scope of the disclosure.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for identifying topics in unstructured data, the method being performed by a computer system, the method comprising:
   obtaining unstructured data from at least one data source, wherein the obtained unstructured data includes at least one unstructured data object;
   determining, based on the obtained unstructured data, at least one set of topic identification rules;
   identifying, based on the at least one unstructured data object and the at least one set of topic identification rules, at least one candidate topic of the unstructured data; and
   analyzing the unstructured data with respect to the at least one candidate topic to determine at least one representative topic from among the at least one candidate topic, wherein each of the at least one representative topic indicates a context of at least a portion of the unstructured data.

2. The method of claim 1, further comprising:
   monitoring the at least one data source, wherein the unstructured data is obtained based on the monitoring.

3. The method of claim 1, further comprising:
   obtaining metadata associated with the obtained unstructured data, wherein the at least one candidate topic is identified further based on the metadata.

4. The method of claim 1, wherein identifying at least one candidate topic of the unstructured data further comprises:
   determining a type of each unstructured data object, wherein the at least one set of topic identification rules is determined further based on the determined unstructured data object types.

5. The method of claim 4, wherein determining a type of each unstructured data object further comprises:
   partitioning each unstructured data object into a plurality of portions; and
   identifying, for each unstructured data object, a type of each portion, wherein the type of the unstructured data object is determined further based on the identified portion types.

6. The method of claim 1, wherein analyzing the unstructured data further comprises:
   correlating among the unstructured data, wherein the at least one representative topic is determined based on the correlation.

7. The method of claim 1, further comprising:
storing, in a database, the at least one representative topic; and
associating each representative topic with at least one of the at least one unstructured data object.

8. The method of claim 7, further comprising:
receiving a search query;
matching the received query to at least the stored one of the determined representative topics; and
returning, as part of search results supplied in response to the received query, at least the at least one unstructured data object associated with the matched stored representative topic.

9. The method of claim 8 wherein the received search query includes at least one topic and wherein the topic of the received query is matched to at least one of the determined representative topics.

10. The method of claim 1, further comprising:
receiving a search query;
matching the received query to at least one of the determined representative topics;
identifying at least one of the at least one unstructured data object that is associated with the matched determined representative topic; and
returning at least the identified at least one unstructured data object as part of search results supplied in response to the received search query.

11. The method of claim 10 wherein the received search query includes at least one topic and wherein the matching step matches the topic of the received query to at least one of the determined representative topics.

12. A non-transitory computer readable medium having stored thereon instructions for causing one or more processing units to execute a method, the method comprising:
obtaining unstructured data from at least one data source, wherein the obtained unstructured data includes at least one unstructured data object;
determining, based on the obtained unstructured data, at least one set of topic identification rules;
identifying, based on the unstructured data and the at least one set of topic identification rules, at least one candidate topic of the unstructured data; and
analyzing the unstructured data with respect to the at least one candidate topic to determine at least one representative topic from among the at least one candidate topic, wherein each of the at least one representative topic indicates a context of at least a portion of the unstructured data.

13. A system for identifying topics in unstructured data, comprising:
a processing circuitry; and
a memory, the memory containing instructions that, when executed by the processing circuitry, configure the system to:
obtain unstructured data from at least one data source, wherein the obtained unstructured data includes at least one unstructured data object;
determine, based on the obtained unstructured data, at least one set of topic identification rules;
identify, based on the at least one unstructured data object and the at least one set of topic identification rules, at least one candidate topic of the unstructured data; and
analyze the unstructured data with respect to the at least one candidate topic to determine at least one representative topic from among the at least one candidate topic, wherein each of the at least one representative topic indicates a context of at least a portion of the unstructured data.

14. The system of claim 13, wherein the system is further configured to:
monitor the at least one data source, wherein the unstructured data is obtained based on the monitoring.

15. The system of claim 13, wherein the system is further configured to:
obtain metadata associated with the obtained unstructured data, wherein the at least one candidate topic is identified further based on the metadata.

16. The system of claim 13, wherein the system is further configured to:
determine a type of each unstructured data object, wherein the at least one set of topic identification rules is determined further based on the determined unstructured data object types.

17. The system of claim 16, wherein the system is further configured to:
partition each unstructured data object into a plurality of portions; and
identify, for each unstructured data object, a type of each portion, wherein the type of the unstructured data object is determined further based on the identified portion types.

18. The system of claim 17, wherein the system is further configured to:
correlate among the unstructured data, wherein the at least one representative topic is determined based on the correlation.

19. The system of claim 13, wherein the system is further configured to:
store, in a database, the at least one representative topic; and
associate each representative topic with at least one of the at least one unstructured data object.

20. The system of claim 13, wherein the system is further configured to:
receive a search query;
match the received query to at least one of the determined representative topics;
identify at least one of the at least one unstructured data object that is associated with the matched determined representative topic; and
return at least the identified at least one unstructured data object as part of search results supplied in response to the received search query.

* * * * *